United States Patent
Godwin

(10) Patent No.: US 7,625,269 B2
(45) Date of Patent: Dec. 1, 2009

(54) PORTABLE GAME HOIST AND SKINNING DEVICE

(76) Inventor: David E. Godwin, 330 Columbia 9 S., Emerson, AR (US) 71740

( * ) Notice: Subject to any disclaimer, the term of this patent is extended or adjusted under 35 U.S.C. 154(b) by 0 days.

(21) Appl. No.: 12/313,240

(22) Filed: Nov. 18, 2008

(65) Prior Publication Data

US 2009/0143001 A1 Jun. 4, 2009

Related U.S. Application Data

(60) Provisional application No. 60/996,518, filed on Nov. 21, 2007.

(51) Int. Cl.
*A22C 17/00* (2006.01)
(52) U.S. Cl. .................................................. 452/129
(58) Field of Classification Search .................. 452/125, 452/127–130
See application file for complete search history.

(56) References Cited

U.S. PATENT DOCUMENTS

| | | | | |
|---|---|---|---|---|
| 5,211,601 A | * | 5/1993 | Cope | 452/187 |
| 5,562,534 A | * | 10/1996 | McGough | 452/187 |
| 6,250,483 B1 | * | 6/2001 | Frommer | 212/180 |
| 6,626,748 B2 | * | 9/2003 | Homer, Sr. | 452/189 |
| 6,705,821 B2 | * | 3/2004 | Philipps et al. | 414/462 |
| 7,059,955 B2 | * | 6/2006 | Green et al. | 452/189 |
| 7,201,552 B1 | * | 4/2007 | Angel et al. | 414/462 |
| 7,244,173 B2 | * | 7/2007 | Lake | 452/128 |
| 7,476,149 B2 | * | 1/2009 | Burrows | 452/187 |

* cited by examiner

*Primary Examiner*—Thomas Price
(74) *Attorney, Agent, or Firm*—Dennis B. Haase

(57) ABSTRACT

A combined hoist and skinning apparatus which is readily assembled and disassembled in the field for use and transportation. An animal to be skinned is raised on the hoist and a skinning assembly is provided at or near the base of the hoist. In order to skin the animal, cuts are made in the skin, which frees a segment of the skin, the end of which is then inserted into the skinning assembly, where it is wound onto a rod. The process is repeated until the animal has been skinned.

8 Claims, 3 Drawing Sheets

PORTABLE GAME HOIST AND SKINNING DEVICE

This application claims priority under provisional application Ser. No. 60/996,518, filed Nov. 21, 2007.

BACKGROUND

1. Field of the Invention

This invention is concerned with the field of game skinning devices. More specifically, this invention is concerned with a novel combination portable game hoist and skinning device that can be assembled, disassembled and transported to various locations for skinning and dressing various game animals.

During hunting, game animals must be skinned and dressed soon after they are shot in order to preserve the meat for future consumption and use. Certain game animals, such as deer and boar, are too heavy and bulky to skin and dress without the aid of mechanical lifting and hoisting devices. However, many lifting and hoisting devices are generally large, heavy and cumbersome, making them difficult if not impossible to be transported or otherwise made available to skin and dress game animals near or where the game animal has been shot, such as in the field or other useful locations.

The subject of the instant invention introduces a portable game hoist and skinning device that can be disassembled, transported to a location for hoisting, skinning and dressing a game animal, and reassembled to perform said hoisting, skinning and dressing. The device is situated upon a ground or support surface after reassembly and can be further secured by releasably attaching the device at one end thereof to a trailer hitch or other similar equipment of a motor vehicle.

2. Overview of the Prior Art

The existence of a portable game hoist and skinning device designed to accommodate the needs of hunters and outdoors men for skinning and dressing game animals at various locations in the field is unknown at the present time. For example, numerous designs for game hoisting and skinning devices have been provided in the prior art. Even though these designs may be suitable for the specific individual purposes to which they address, they would not be suitable for the purposes of the present version of the invention as such designs are generally cumbersome to use or limited in their ability to hoist a wide variety of game animals. These designs are exemplified by the following patents:

U.S. Pat. No. 4,806,063, Portable Wild Game Hoist, issued to York on 21 Feb. 1989;

U.S. Pat. No. 5,211,526, Mobile Crane, issued to Robinette on 18 May 1993;

U.S. Pat. No. 5,211,601, Mechanical Deer Skinning Device, issued to Cope on 18 May 1993;

U.S. Pat. No. 5,395,284, Big Game Hoist, issued to Frisk on 7 Mar. 1995;

U.S. Pat. No. 5,791,858, Vehicle Mounted Game Skinning Device, issued to Sasser on 11 Aug. 1998; and U.S. Pat. No. 6,739,964, Deer Hoist, issued to Gearhart on 25 May 2004.

As illustrated by the background art, efforts are continuously being made in an attempt to develop devices for hoisting game animals. No prior effort, however, provides the benefits attendant with the present invention.

As such, it may be appreciated that there is a continuing need for a new and improved portable game hoist and skinning device that can be assembled, disassembled, and transported to various locations for skinning and dressing a wide variety of game animals, such as deer, boar and the like. In these respects, the present version of the invention substantially departs from the conventional concepts and designs of the prior art and, in so doing, provides an apparatus that substantially fulfills this need. Additionally, the prior patents and commercial techniques do not suggest the present inventive combination of component elements arranged and configured as disclosed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

Described briefly, according to a typical embodiment, the invention presents a portable game hoist and skinning device that is comprised generally of a horizontally aligned tubular member having first and second opposed ends, support member, winch support member with first winch, vertically aligned tubular member with second winch and a line guide, top tubular member, first and second pulleys attached to said top tubular member, a hanger with opposed hooks, and a line, said line attached at a first end to the second winch and at a second end to the hanger.

The support member is releasably attached to the horizontally aligned tubular member over the second end of the tubular member. The winch support member is comprised of a first tubular member, second and third tubular members attached to opposed ends of the first tubular member, and a fourth tubular member attached to a medial section of the first tubular member. The fourth tubular member is inserted into the horizontally aligned tubular member at the second end thereof. The first winch with handle is attached to the second tubular member, and a plate with aperture is attached to the third tubular member. A rod is connected at a first end thereof to the winch and at a second end thereof to the plate within the aperture thereof. A trailer hitch connector can be releasably attached as needed to the first end of the horizontally aligned tubular member.

The vertically aligned tubular member is attached in perpendicular relation to the horizontally aligned tubular member. It is comprised of upper and lower tubular members. A line guide and second winch with handle are located on the lower tubular member, and a top tubular member is attached in perpendicular relation to the upper end of the upper tubular member. The first and second pulleys are attached in pivoting engagement to the top tubular member. A plate with aperture is located at the unattached end of the top tubular member. A hook is inserted into the aperture of the plate. During nonuse of the device, the hanger is attached to the hook.

A game animal is hoisted upon the device for skinning by rotating the handle of the second winch to lower the hanger upon a ground or support surface. The hind legs of the game animal are disposed within the hooks of the hanger, and the handle of the first winch is rotated to take up the line and hoist the game animal, attached to the hangar, upon the pulleys. When the game animal is raised above the winch support member, a section of skin is removed from the body of the game animal and attached at an end thereof to the rod of the winch support member. The handle of the first winch is then turned to rotate the rod as needed to roll up and accumulate the end of the skin as needed to remove skin from the body of the game animal.

During storage and transport, the portable game hoist and skinning device can be disassembled by detaching the support member and winch support member from the horizontally aligned tubular member; the line guide from the lower tubular member of the vertically aligned tubular member; the top tubular member from the upper tubular member of the vertically aligned tubular member; the upper tubular member of the vertically aligned tubular member from the lower tubular member; and the lower tubular member from the horizontally aligned tubular member.

My invention, therefore, resides not in any one of these features per se, but rather in the particular combination of all of them herein disclosed. It is distinguished from the prior art in this particular combination of all of its structures for the functions specified.

In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention.

Further, the purpose of the foregoing abstract is to enable the U.S. Patent and Trademark Office and the public, generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, nor is it intended to be limiting as to the scope of the invention in any way.

Accordingly, it is an object of my version of the invention to provide a low cost, easy to manufacture and easy to market portable game hoist and skinning device.

A further object of my version of the invention is to provide an easy to use and versatile, portable game hoist and skinning device.

A significant object of the invention is to provide a portable game hoist and skinning device that is comprised of a horizontally aligned tubular member, support member, winch support member with first winch, vertically aligned tubular member with second winch, a line guide, top tubular member, first and second pulleys attached to said top tubular member, a hanger with opposed hooks, and a line, said line attached at a first end to the second winch and at a second end to the hanger.

A final, but very significant, object of the invention is to provide a portable game hoist and skinning device that can be assembled, disassembled and transported to various locations for skinning and dressing a wide variety of game animals, such as deer, boar and the like.

For a better understanding of the invention, its operating advantages and the specific objects attained by its uses, reference should be made to the accompanying drawings and descriptive matter, in which there is illustrated a preferred embodiment of the invention. The foregoing has outlined some of the more pertinent objects of the invention. These objects should be construed to be merely illustrative of some of the more prominent features and applications of the present invention. Many other beneficial results can be attained by applying the disclosed invention in a different manner, or by modifying the invention within the scope of the disclosure. Accordingly, other objects and a fuller understanding of the invention may be had by referring to the summary of the invention and the detailed description of the preferred embodiment, in addition to the scope of the invention, illustrated by the accompanying drawings.

BRIEF DESCRIPTION OF THE DRAWINGS

The foregoing and other objects, features and advantages of the invention will become more fully understood from the following description of the preferred embodiment of the invention, as illustrated in the accompanying drawings in which like reference characters refer to the same parts throughout different views. The drawings are not necessarily to scale, emphasis instead being placed upon illustrating the principles of the invention.

DESCRIPTION OF THE PREFERRED EMBODIMENTS

Figure 1:
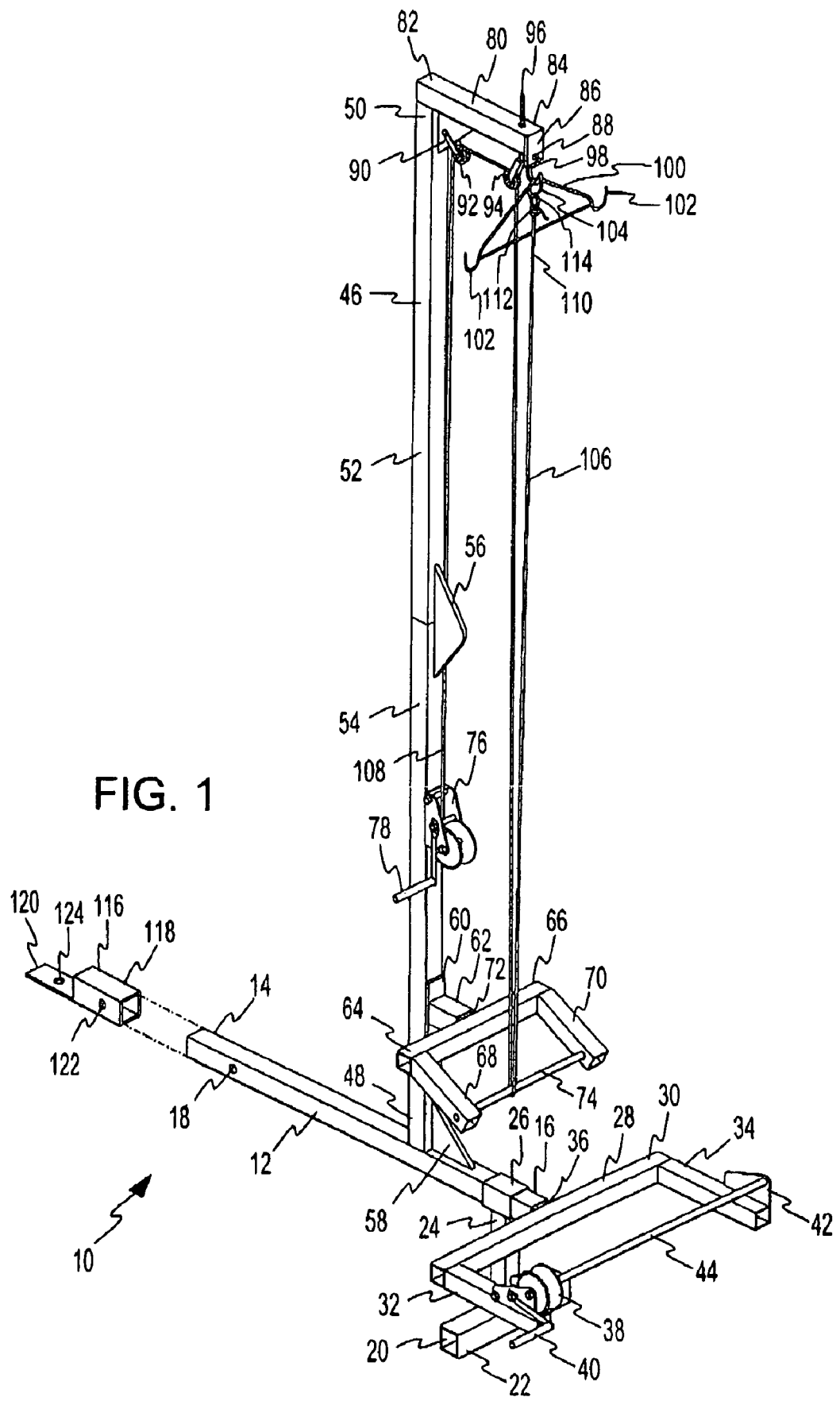
FIG. 1 is a perspective view of a portable game hoist and skinning device in accordance with the present version of the invention.

Referring now to the drawings and, in particular, to FIG. 1 wherein there is illustrated a typical embodiment of the portable game hoist and skinning device 10. The present invention 10 is comprised of a first tubular member 12 that is aligned horizontally with respect to a ground, or support, surface. The tubular member 12 is defined by first 14 and second 16 opposed ends. Apertures 18 are located on opposed sidewalls of the tubular member 12 proximate to the first end 14 thereof.

A support member 20 is attached in sliding engagement onto the first tubular member 12 at or near the second end 16 of the tubular member 20. The support member 20 is comprised of a first tubular member 22, a second tubular member 24, and a collar 26. The second tubular member 24 is attached at a first end thereof in perpendicular relation to the first tubular member 22 at the medial section thereof. The collar 26 is attached to the second end of the second tubular member 24. The second end 16 of the horizontally aligned tubular member 12 occupies the collar 26 of the support member 20. The support member 20 at the first tubular member thereof 22 makes contact with a ground, or support, surface so as to maintain the device 10 at a proper elevation above the ground or support surface.

A winch assembly includes a support member 28, which is releasably attached to the horizontally aligned tubular member 12, preferably at the second end 16 thereof. The winch support member 28 is comprised of a first tubular member 30, second 32 and third 34 tubular members, fourth tubular member 36. A first manual winch 38 with handle 40, plate 42, and rod 44 is positioned in a horizontal orientation by the winch support member. The second 32 and third 34 tubular members are attached perpendicularly to the first tubular member 30 at opposed ends thereof. The fourth tubular member 36 is connected perpendicularly to the medial section of the first tubular member 30. The winch support member 28 is secured to the horizontally aligned tubular member 12 by inserting the tubular member 36 thereof into the tubular member 12 at the second end 16 thereof so as to maintain the winch support member 28 in position, as illustrated.

The winch 38 is part of the skinning apparatus of the invention and is located on the second tubular member 32 at the end thereof opposite to the end of the tubular member 32 attached to the first tubular member 30. The plate 42 is located on the third tubular member 34 at the end thereof opposite to the end of the tubular member 34 attached to the first tubular member 30. The rod 44 is connected at a first end thereof to the winch 38 and at a second end thereof to the plate 42 within an aperture thereof. Rotating the winch 38 by the handle 40 turns the rod 44 within the aperture of the plate 42.

A vertically aligned tubular member 46 having first 48 and second 50 opposed ends is releasably attached at the first end 48 thereof to the horizontally aligned tubular member 12. The tubular member 46 consists, further, of an upper tubular member 52 and a lower tubular member 54 that are releasably attached at cooperating ends thereof. A plate 56 is attached to the upper tubular member 52 at the lower end thereof. The plate 56 maintains the upper tubular member 52 in alignment with the lower tubular member 54. A tubular member, located within the tubular members 52, 54, connects the upper 52 and lower 54 tubular members to each other 52, 54 at said cooperating ends.

A brace 58 is attached to the lower end 48 of the vertically aligned tubular member 46 to add strength. The brace 58 maintains the vertically aligned tubular member 46 in perpendicular relation with the horizontally aligned tubular member 12.

A plate 60 with collar 62 is located on the lower tubular member 54 of the vertically aligned tubular member 46. A line guide 64 is releasably attached to the collar 62 and is maintained in position above the winch support member 28. The line guide 64 is comprised of a first tubular member 66, second 68 and third 70 tubular members, fourth tubular member 72 and rod 74. The second 68 and third 70 tubular members are attached at X angle to the first tubular member 66 at opposed ends thereof. The rod 74 is connected at a first end thereof to the unattached end of the second tubular member 68 and at a second opposed end thereof to the unattached end of the third tubular member 70.

The fourth tubular member 72 is connected perpendicularly to the medial section of the first tubular member 66. The tubular member 72 is inserted into the collar 62 so as to maintain the line guide 64 in position, as illustrated.

A second manual winch 76 with handle 78 is located on the lower tubular member 54 of the vertically aligned tubular member 46 between the connector plate 56 and plate 60 with collar 62.

A top tubular member 80 with first 82 and second 84 opposed ends is releasably attached at the first end 82 thereof to the vertically aligned tubular member 46 at the second end 50 thereof. A plate 86 with aperture 88 is attached to the tubular member 80 at the second end 84 thereof. A brace 90 is attached to the vertically aligned tubular member 46 at the second end 50 thereof and supports the tubular member 80 in perpendicular alignment over the vertically aligned tubular member 46.

A first pulley 92 is attached in pivoting engagement to the brace 90, and a second pulley 94 is attached in pivoting engagement to the tubular member 80 at the second end 84 thereof. A threaded bolt 96 secures the second pulley 94 to the tubular member 80, and the pulleys guide the line as part of the hoisting function.

A hook 98 is disposed within the aperture 88 of the plate 86, and a hanger 100 is located on the hook 98. The hanger 100 is comprised in part of first and second opposed hooks 102 and a ring 104 located there between. A line 106 is attached at a first end 108 thereof to the second winch 76 and at a second end 110 thereof to the hanger 100 on the ring 104 thereof. More particularly, the line 106 at the second end 110 thereof is attached to a ring 112, which is releasably attached to a clasp 114. The clasp 114 is releasably attached to the ring 104 of the hanger 100.

An accessory in the nature of a trailer hitch connector 116 is aligned for releasable attachment to the horizontally aligned tubular member 12 at the first end 14 thereof, and affords the user a means of anchoring the hoist to a vehicle during use. The trailer hitch connector 116 is comprised of a collar 118 and bottom plate 120. Apertures 122 are located on opposed sidewalls of the collar 118, and an aperture 124 is located medially within the bottom plate 120. The connector 116 is secured to the device 10 by sliding the collar 118 over the first end 14 of the horizontally aligned tubular member 12 until the apertures 122 of the collar 118 align with the apertures 18 of the horizontally aligned tubular member 12. A first pin (not shown) is inserted through the aligned apertures 122, 18 to secure the trailer hitch connector 116 to the tubular member 12 of the device 10, and a second pin (not shown) is inserted through the aperture 124 of the bottom plate 120 of the connector 116 to secure the connector 116 to the trailer hitch of a vehicle.

The tubular members and various other components of the device 10 are fabricated of material that is durable and rigid, such as steel, carbon steel, stainless steel, aluminum, various composite materials and the like.

Figure 2:
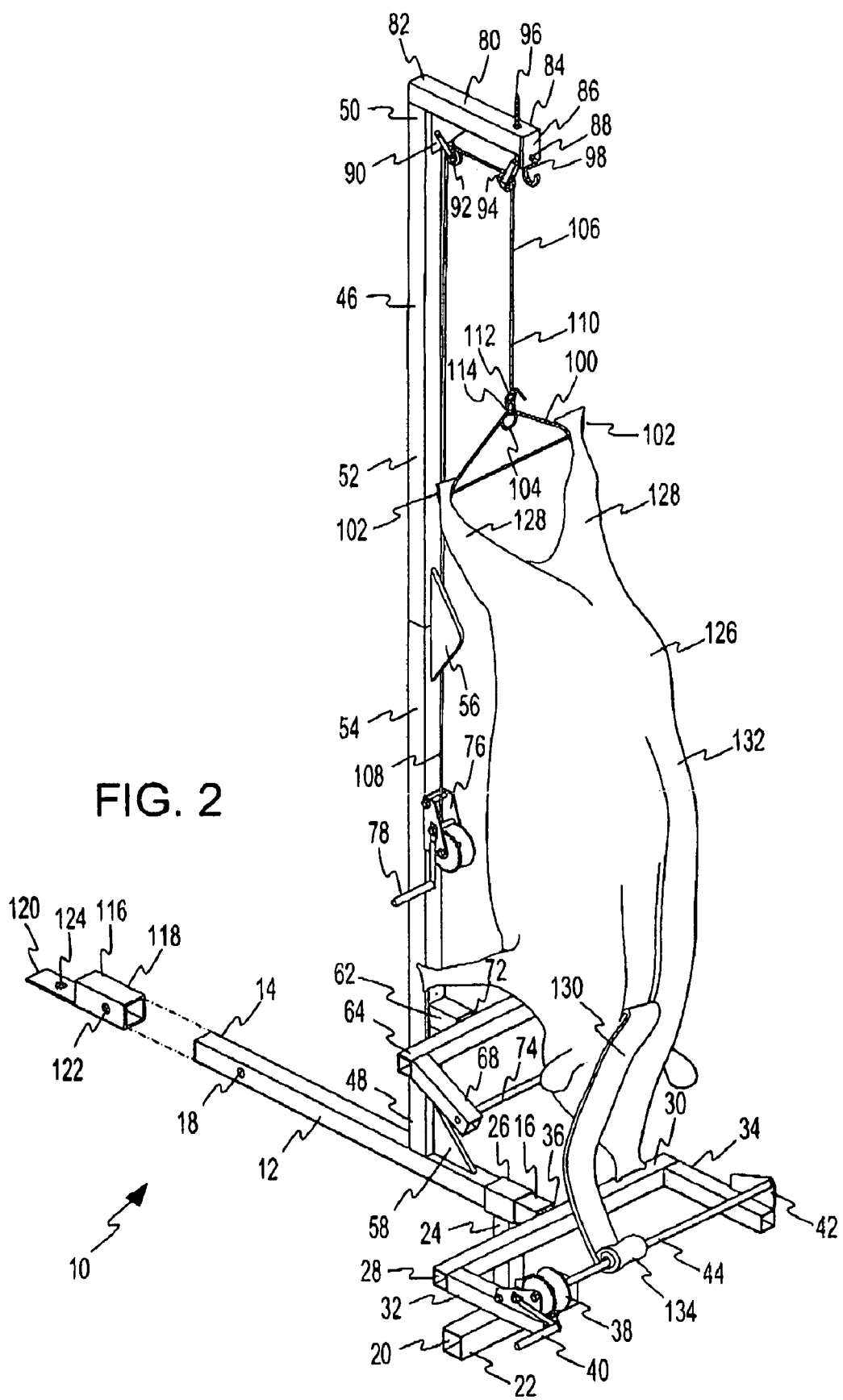
FIG. 2 is a perspective view of a portable game hoist and skinning device with a game animal hoisted thereon for skinning in accordance with the present version of the invention.

Referring to FIG. 2, therein illustrated is a game animal 126 attached to the hanger 100 of the device 10 and hoisted above the winch support member 28 for skinning. The hanger 100 is removed from the hook 98 and lowered upon the line 106 by rotating the handle 78 of the second winch 76 until the hanger 100 reaches the game animal 126 resting upon the ground or disposed within the hooks 102 of the hanger 100, and the handle 78 of the winch 76 is rotated so that the winch 76 takes up the line 106 upon the pulleys 92, 94 to raise the hanger 100 with game animal 126 attached thereon until the game animal 126 is hanging above the winch support member 28.

An appropriate cut is made along the back of the animal and a portion of skin 130 is thereby separated from the body 132 of the game animal 126, and the end 134 of the removed skin is wrapped around the rod 44 of the winch support member 28. The handle 40 of the first winch 38 is turned to rotate the rod 44, which accumulates and rolls up the end 134 of the skin 130. The handle 40 of the first winch 38 is further rotated to remove subsequent portions of skin 130 from the body 132 of the game animal 126. In order to complete the process, additional portions of skin 130 are attached to the rod 44 to accelerate the skinning process. Once the game animal 126 is fully skinned, it 126 can be dressed upon the device 10 for later quartering and storage.

Figure 3:
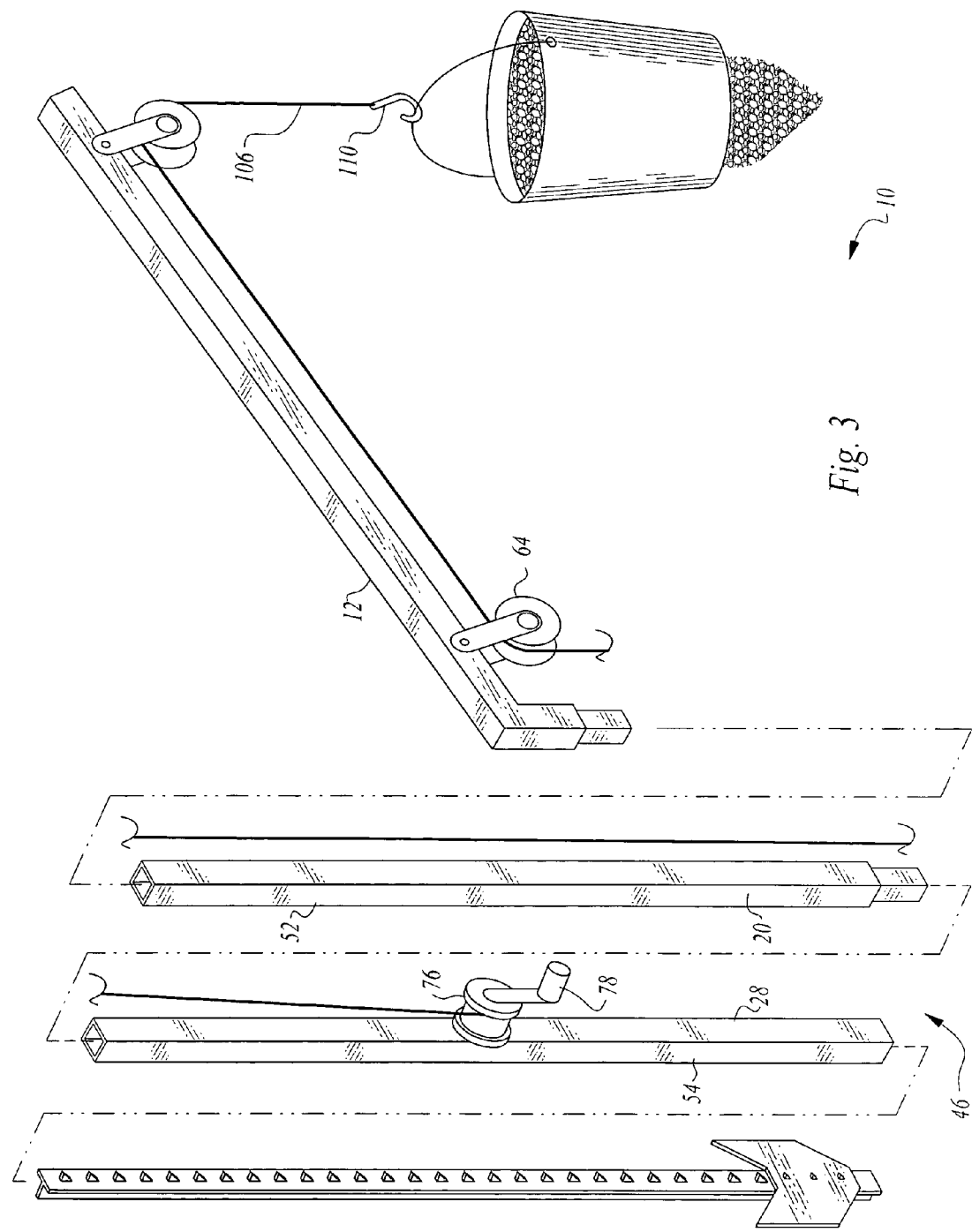
FIG. 3 is a pictorial representation of the hoist of the present invention, illustrating an alternative method of anchoring the hoist and an alternate use thereof.

Referring to FIG. 3, an alternative use of the portable game hoist and skinning device 10, is, for example, a bucket feeder shown as attached to the second end 110 of the line 106 for attracting and feeding game animals. The vertically aligned tubular member 46 is detached from the horizontally aligned tubular member 12, and the line guide 64 is detached from the vertically aligned tubular member 46. A metal Tee post is driven into the ground with a substantial portion thereof extending above the ground surface. The vertically aligned tubular member 46 is fitted over the portion of the Tee post extending above the ground surface so as to maintain the vertically aligned tubular member 46 in perpendicular relation above the ground surface. The bucket feeder, attached to the second end 110 of the line 106, can be raised and lowered by rotating the handle 78 of the second winch 76.

The present invention is particularly suited for use in the field in that it is readily assembled for use and disassembled for transportation. During storage and transport, the portable game hoist and skinning device 10 can be disassembled by detaching the support member 20 and winch support member 28 from the horizontally aligned tubular member 12; the line guide 64 from the lower tubular member 54 of the vertically aligned tubular member 46; the top tubular member 80 from the upper tubular member 52 of the vertically aligned tubular member 46; the upper tubular member 52 of the vertically aligned tubular member 46 from the lower tubular member 54; and the lower tubular member 54 from the horizontally aligned tubular member 12.

While this version of the invention has been illustrated and described in detail in the drawings and foregoing description, the same is to be considered as illustrative and not restrictive in character, it being understood that only the preferred embodiments have been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it will be understood by persons skilled in the art that an improved, portable game hoist and skinning device has been provided. The invention is relatively simple and easy to manufacture, yet affords a variety of uses. Although this invention has been described in its preferred form with a certain degree of particularity, it is understood that the present disclosure of the preferred form has been made only by way of example and changes in the details of construction and combination and arrangement of parts may be resorted to without department from the spirit and scope of the invention, as defined by the following claims:

The invention claimed is:

1. An apparatus for hoisting and skinning of an animal, comprising:
    a hoist; said hoist having an upstanding tubular member, said tubular member having first and second opposed ends, said tubular member further being removably supported on a horizontally aligned tubular member;
    a first winch attached to said upstanding tubular member; a line extending from said winch, said line having a hanger at a remote end thereof, said hanger being attachable to an animal to be hoisted when said winch is rotated to wind said line thereon;
    a second winch assembly, said second winch assembly including a rod said rod being rotatable by said winch, said rod adapted to receive a portion of skin from the animal on the hoist, said portion of said skin being attachable to said rod whereby rotation of said second winch rotates said rod to pull said portion of skin from the animal, wrapping the same about said rod.

2. The apparatus of claim 1, wherein said second winch is removably attached to said hoist.

3. The apparatus of claim 1, wherein said hoist includes a line guide.

4. The apparatus of claim 1, wherein said hoist includes a removable trailer hitch connecter, said trailer hitch being attachable to a stationary object to position said hoist.

5. The apparatus of claim 1, wherein said hoist is modular and is disassembled for transporting the same.

6. The apparatus of claim 1, wherein a winch support member is provided, said winch support member comprising a series of tubular members arrayed in a "U" shape, said rod being supported in said winch support member in a substantially horizontal orientation.

7. The apparatus of claim 1, wherein a support member is provided, said support member being slidably attached to an end of said horizontally aligned tubular member in order to elevate said end of said horizontally aligned tubular member to a proper level above the ground.

8. The apparatus of claim 7, wherein said end of said horizontally aligned tubular member also supports said winch support member.

* * * * *